J. RIBAYSEN.
AUTOMOBILE FENDER.
APPLICATION FILED NOV. 16, 1914.
1,201,346.
Patented Oct. 17, 1916.
2 SHEETS—SHEET 2.
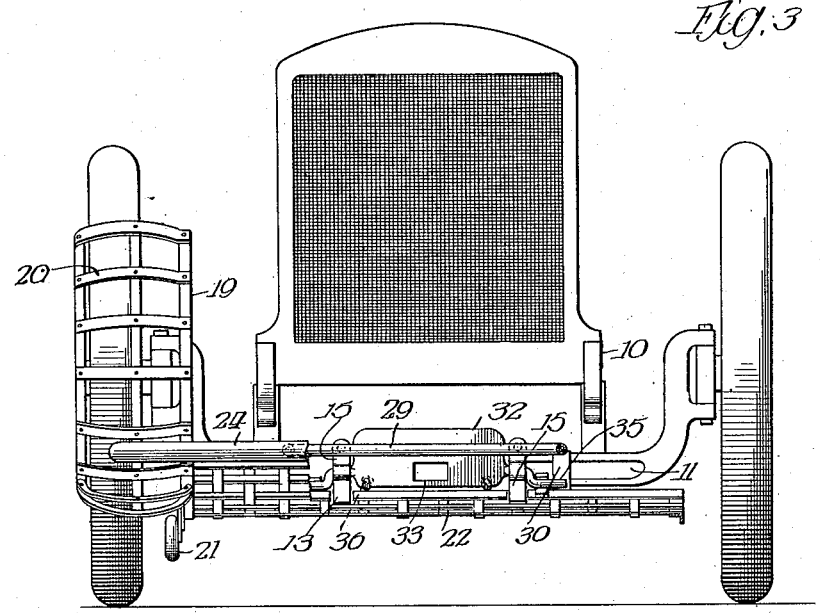
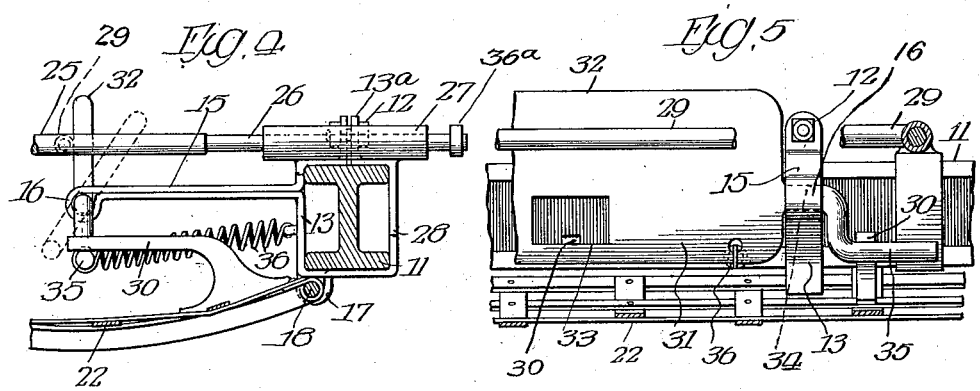
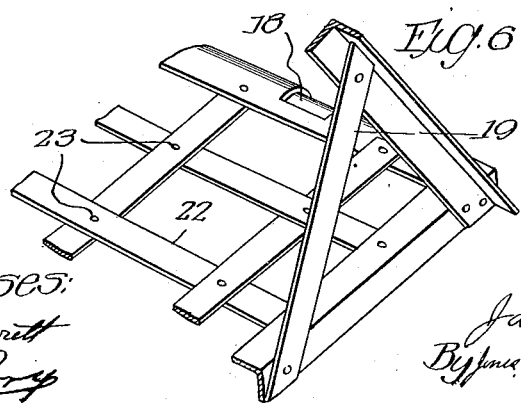

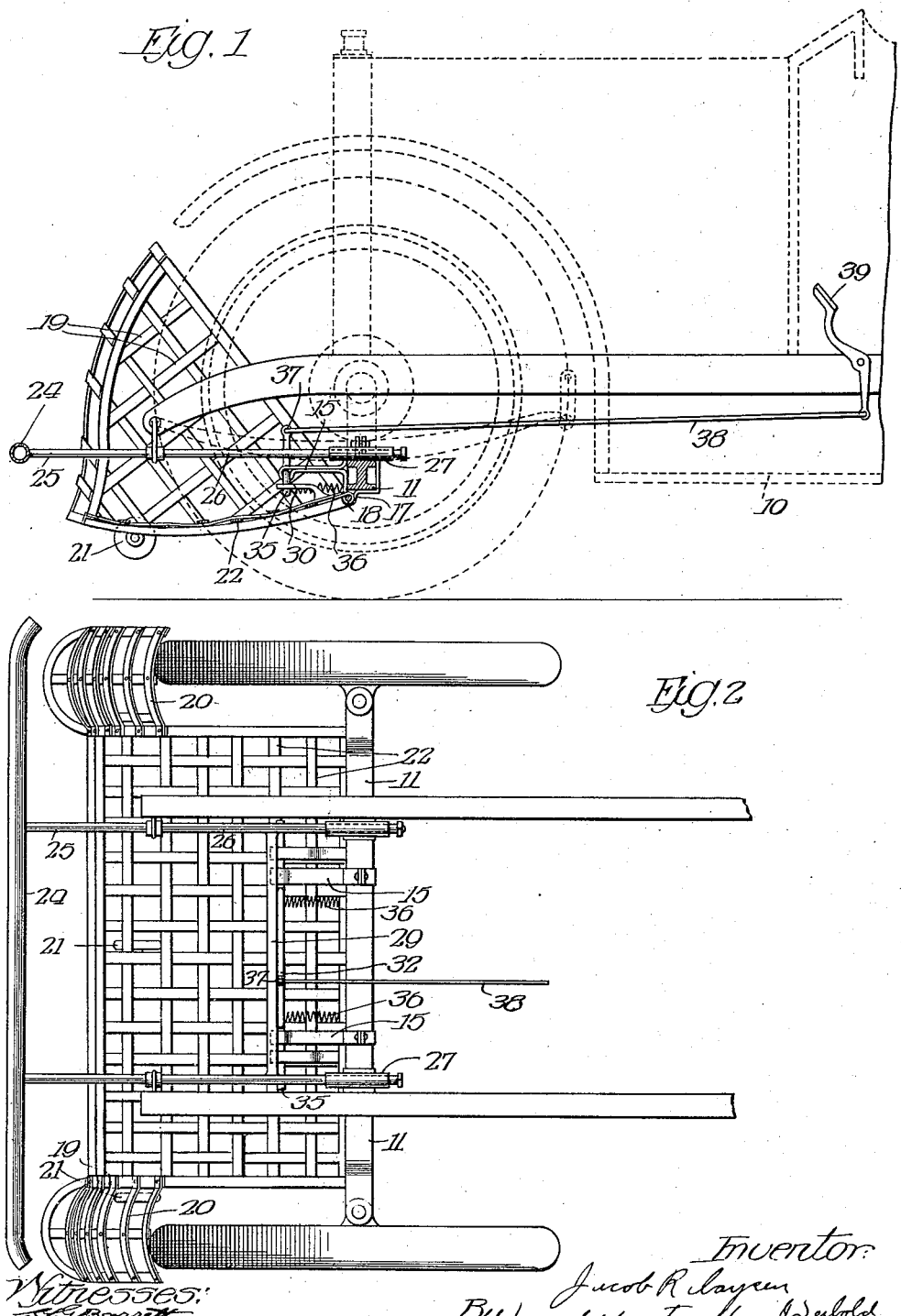

UNITED STATES PATENT OFFICE.

JACOB RIBAYSEN, OF CHICAGO, ILLINOIS.

AUTOMOBILE-FENDER.

1,201,346.   Specification of Letters Patent.   Patented Oct. 17, 1916.

Application filed November 16, 1914. Serial No. 872,322.

*To all whom it may concern:*

Be it known that I, JACOB RIBAYSEN, a subject of the Czar of Russia, residing at Chicago, in the county of Cook and State of Illinois, have invented new and useful Improvements in Automobile-Fenders, of which the following is a full, clear, concise, and exact description, reference being had to the accompanying drawing, forming a part of this specification.

My invention relates to improvements in automobile fenders.

It often happens that in driving an automobile it is impossible to avoid a collision with pedestrians or with children who are apt to dart unexpectedly in front of the machine.

One of the objects of my invention is to provide an improved device to be attached to the front of the automobile which will minimize the dangerous result of such a collision.

Further objects will appear from the detailed description to follow.

In the drawings, in which I have illustrated one embodiment of my invention; Figure 1 is a side view of the front part of an automobile showing my improved device attached thereto; Fig. 2 is a plan view of the parts shown in Fig. 1; Fig. 3 is a front elevation of the automobile and fender parts being omitted; Fig. 4 is a detailed view showing a section through the front axle of the automobile and the manner in which the scoop fender and buffer bar are attached thereto; Fig. 5 is a detailed sectional view showing the manner in which the latch mechanism is operated; and Fig. 6 is a perspective view showing details of construction of the scoop fender.

Referring now to the drawing in detail reference character 10 indicates, in general, the front part of an automobile, to the front axle 11 of which is attached a bracket 13 by means of bolts 12 extending through upwardly extending ears 13ª of the bracket. The bracket has a forward extension 15 provided with looped bearing members 16, and said bracket is also provided with a downwardly extending bearing loop 17 in which is pivotally mounted a rod 18 to which the scoop-fender 19 is secured.

Reference character 20 indicates a wheel guard which is secured to the fender 19 in any suitable manner, as by rivets. The scoop-fender is also provided with rollers 21 mounted underneath in a position to engage the road bed when the fender is dropped. The fender itself is formed of interwoven strips of sheet metal or other suitable material secured together by means of rivets 23. In front of the fender is the buffer 24 having rods or slides 25 secured thereto and extending rearwardly therefrom. The rods 25 have their rear ends reduced as at 26 to slidably engage the sleeves 27 secured to the bracket 28 shown broken away in Fig. 4 mounted on the axle 11. The rods 25 are connected by a cross-bar 29. The scoop-fender 19 has secured thereto a plurality of hook members 30. A latch member 31 comprising a plate 32, provided with an aperture 33, has a journal member 34 mounted in the bearing loops 16. The journal member 34 is extended to form a latch member 35 for engagement with the outside hook member 30. The middle hook member 30 engages the lower edge of the opening 33. The spring 36 secured to the plate 32 tends to hold the latch members in engagement with the hooks and causes the plate 32 to bear against the bar 29 to cause the stop 36ª to abut against the end of the sleeve 27. Secured to the upper edge of the plate 32 is an eye 37 to which is secured a rod 38 connected to a foot lever 39 in a convenient position to be operated by the driver.

The operation of my improved device is as follows: Assuming that a collision with a pedestrian takes place, the pedestrian will first be struck by the buffer bar 24 which will thus be caused to slide rearwardly with respect to the sleeves 27. This will cause the cross-bar 29 to engage the upper part of the plate 32 causing the latter to tilt in the bearing loops 16, and causing the lower part of the plate to move forward to release the hooks 30 from engagement with the latch members. The fender thereupon drops by its own weight until the rollers 21 engage the road bed, in which position the lower front edge of the fender will be so close to the road bed that it will be impossible for the machine to ride over the pedestrian. In the case of running into a child, the child will fall into the fender and be carried along. In the case of obstructions which are too low to be engaged by the buffer bar 24 the fender may be manually released by pressing on the foot lever 39 which will cause the release of the hooks 30 and the dropping of the fender.

Having thus described my invention what I claim as new and desire to secure by Letters Patent is:—

1. The combination with a vehicle having an axle, of a strap encircling said axle and bent to form two bearing loops, a fender pivotally mounted in one of said loops, and a latching member for holding the fender in position pivotally mounted in the other loop.

2. The combination with a vehicle having an axle, a strap encircling said axle and bent to form two bearing loops, a fender pivotally mounted in one of said loops, a latching member for holding the fender in position pivotally mounted in the other loop, a buffer bar extending transversely in front of said vehicle, slides secured to said buffer bar and extending rearwardly therefrom, guides for said slides, and means carried by said slides for releasing said latching member.

In witness whereof, I have hereunto subscribed my name in the presence of two witnesses.

JACOB RIBAYSEN.

Witnesses:
W. L. POLLARD,
ANNE SOLOMON.

Copies of this patent may be obtained for five cents each, by addressing the "Commissioner of Patents, Washington, D. C."